Patented July 24, 1951

2,561,822

UNITED STATES PATENT OFFICE 2,561,822

CONCENTRATION OF OLEFINS

Michael Savoy, Chicago, Ill., assignor to The Pure Oil Company, Chicago, Ill., a corporation of Ohio No Drawing. Application December 28, 1946, Serial No. 719,129

13 Claims. (Cl. 260—677)

This invention relates to a method of separating olefinic hydrocarbons from hydrocarbon mixtures by selectively absorbing the olefins in a solution containing a cuprous salt. The invention relates particularly to the composition of the solution and the balancing of its composition in order to effect a practicable and economical process for separating and recovering olefinic hydrocarbons from their mixtures.

It is an object of the invention to provide a method for separating olefinic hydrocarbons from hydrocarbon mixtures, which process is characterized by sharpness of the separation and economy in the volume of absorbing material required.

It is a second object of the invention to provide a method of separating olefinic hydrocarbons which can be carried out in batch or continuous manner.

Other objects and advantages of the invention will in part be obvious and in part appear hereinafter.

The process comprises contacting a mixture of hydrocarbons containing one or more olefins and saturated hydrocarbons with a solution of a cuprous salt containing sufficient acid to hold in solution more cuprous salt than can be dissolved in the unacidified solution. For manipulative convenience the process is carried out at ambient temperature and pressure, but operation at elevated pressure is possible. The composition of the solution is adjusted so that the physical properties of the solution, its homogeneity and particularly the viscosity, are consistent with convenient use thereof in the absorption process, so that it can be used under conditions to induce the absorption of a substantial amount of the olefinic hydrocarbon from the mixture upon brief contact therewith. The solution after having absorbed the olefinic hydrocarbon is separated and passed to regeneration stages where the olefin is recovered from the solution by heating it gently.

The solution for the absorption of the olefinic gas is made up according to my invention by combining as a solvent substantially equal parts of an alcohol, such as methanol or ethanol, and a nitrogen base, particularly one of the hydroxy-alkylolamine class. To the solvent there is then added cuprous chloride in amount substantially more than will saturate the solvent. The excess cuprous chloride is brought into solution by the addition of an acid, the amount of which need be only sufficient to bring the excess cuprous chloride into solution. It has been found that inorganic acids are effective to bring the cuprous chloride into solution when added in only very small amount, and that large excesses of the inorganic acids can and do have a detrimental effect upon the physical properties and olefinic absorption capacity of the solution. In the case of organic acids, it has been found that only small excesses are necessary to bring the cuprous salt into solution and that additional amounts substantially greater than the minimum necessary do not appear to offer any advantages. Accordingly, the solution should be made up with the view of keeping the acidity at a level which will maintain the solution homogeneous and yet not consume uneconomically large amounts of acid.

Mixtures of hydrocarbons, such as those which it is proposed to separate, are of common occurrence in hydrocarbon refining operations and may consist of a single olefin mixed with a number of saturated hydrocarbons, or may contain a number of different olefins with saturated hydrocarbons. Since the olefins per se are often desired for specific processes, typical of which are polymerization processes, one of the first steps in their further utilization calls for separation from the concomitant saturated hydrocarbons.

The process for separation of the olefins from saturated hydrocarbons is based on the well-known reaction by which olefins enter into loose and easily reversible combination with cuprous salts. It is equally well known that saturated hydrocarbons do not undergo the same reaction. Although aqueous solutions of cuprous salts have been used for the separation of olefinic hydrocarbons, and refinements of the separation have followed a course of developing solutions employing other solvents, typical of which are those described in United States Patents 2,005,500 and 2,376,239, issued June 18, 1935, and May 15, 1945, respectively, there has been little exploration of the possibility of improving the absorptive capacity of the solution for the olefinic hydrocarbons.

For the purposes of the instant process, the essentially anhydrous cuprous salt olefin-absorbing solution is prepared by dissolving the desired cuprous salt in a solvent consisting of sufficient methanol and a nitrogen base, typified by the hydroxy-alkylolamines. Preferable among the alkylolamines which should be used in the solvent are the ethanolamines, such as mono-, di-, and tri-ethanolamines.

Cuprous chloride is the typical cuprous salt useful in the absorption process because it is the most readily available and cheapest of the various cuprous salts. In preparing the solution, as noted above, the solvent is saturated with cuprous chloride and excess cuprous chloride is incorporated in the solution by adding acid to bring it into solution. We have found that amounts of acid sufficient simply to insure the acidity of the solution will increase its capacity for cuprous chloride by a factor of 2 to 5 or more, and that in general, for purposes of my process, it is desirable to increase the amount of cuprous chloride in the solution over saturation in neutral solution by a factor of about 4 or 5. By so doing, the homogeneity and viscosity of the solution can be maintained favorable and a reasonable economic balance in the use of reagents is maintained. Typical suitable acids, organic and inorganic, are hydrochloridic, phosphoric, sulfuric, benzoic, maleic, sulfamic, salicylic, chloracetic, sulfanilic, sulfosalicylic, citric, tartaric, and formic.

The following examples illustrating typical absorptive solutions for use in carrying out the separation of olefins will illustrate the process and the capacity of the acidified anhydrous solutions:

EXAMPLE I

A solution consisting of 20 cc. of methanol, 20 cc. of mono-ethanolamine, 35 grams of cuprous chloride, and 1.8 grams of hydrogen chloride was used to absorb ethylene. Its capacity for ethylene absorption, measured according to the procedure described below, was found to be 19 cc. of ethylene per cubic centimeter of solution.

A similar solution consisting of 25 cc. of methanol, 20 cc. of mono-ethanolamine, 38 grams of cuprous chloride, and 0.9 gram of hydrogen chloride, when tested, was found to have an absorptive capacity of 18.3 cc. of ethylene per cubic centimeter of solution.

A few similar tests are summarized in the following tabulation of data:

*Table I*

| Exp. No. | MeOH, cc. | Mono-ethanol Amine, cc. | HCl (anhyd) gm. | CuCl, gm. | Absorption Capacity cc. gas per cc. solution |
| --- | --- | --- | --- | --- | --- |
| 1 | 27 | 20 | 1.26 | 20 | 17.3 |
| 2 | 20 | 20 | 1.80 | 35 | 19.0 |
| 3 | 20 | 20 | 3.60 | 20 | 10.6 |
| 4 | 25 | 20 | 0.90 | 35 | 13.3 |
| 5 | 20 | 20 | 0.90 | 35 | 17.3 |
| 6 | 20 | 20 | 0 | 20 | 11.5 |

From the above experimental data it will appear that solutions containing but small proportions of hydrogen chloride have a very sharply increased capacity for cuprous chloride, and likewise a very strongly increased capacity for the absorption of ethylene. The desirable degree of acidification can be expressed in terms of the weight ratio of cuprous chloride to hydrogen chloride. It appears that the ratio should not be substantially smaller than 10:1; to make it very much larger than about 20:1 reduces the efficiency of the solution.

EXAMPLE II

A solution consisting of 20 cc. of methanol, 20 cc. of mono-ethanolamine, 40 grams of cuprous chloride, and 1 gram of benzoic acid, when tested according to the procedure described was found to have an absorptive capacity of 22.3 cc. of ethylene per cubic centimeter of solution.

Similar solutions containing comparable proportions of mono-ethanolamine, methanol, and cuprous chloride with larger amounts of benzoic acid, ranging up to 12 grams, were found to have only slightly increased absorptive capacity for the ethylene. Typical of such solutions containing the increased amount of benzoic acid is the following: 20 cc. of methanol, 20 cc. of mono-ethanolamine, 12 grams of benzoic acid and 60 grams of cuprous chloride, which had an absorptive capacity of 22.7 cc. of ethylene per cubic centimeter of solution.

The following table summarizes a few typical results which illustrate the absorptive capacity of cuprous chloride solutions containing benzoic acids:

*Table II*

| Exp. No. | MeOH, cc. | Mono-Ethanol Amine, cc. | Benzoic Acid, gm. | CuCl, gm. | Absorption Capacity cc. gas per cc. solution |
| --- | --- | --- | --- | --- | --- |
| 1 | 20 | 20 | 2.0 | 40.0 | 22.8 |
| 2 | 20 | 20 | 6.0 | 50.0 | 25.1 |
| 3 | 20 | 20 | 12.0 | 60.0 | 22.7 |
| 4 | 25 | 15 | 3.0 | 40.0 | 25.2 |
| 5 | 25 | 15 | 4.0 | 60.0 | 26.3 |
| 6 | 20 | 20 | 0 | 20.0 | 11.5 |

It is apparent that a small amount of benzoic acid is sufficient to increase materially the capacity of the solution to take up cuprous chloride and ethylene, but that the benefits do not continue to accrue proportionately as the amount of benzoic acid is increased; that is the capacity of the solution is improved by the acidification of benzoic acid, but it is not additionally improved by further acidification.

EXAMPLE III

A solution consisting of 20 cc. of methanol, 20 cc. of mono-ethanolamine, 35 grams of cuprous chloride and 1 gram of maleic acid was found to have an absorptive capacity of 17.3 cc. of ethylene per cubic centimeter of solution. A similar solution containing 20 cc. of methanol, 20 cc. of mono-ethanolamine, 40 grams of cuprous chloride and 2 grams of maleic acid, had an absorptive capacity of 21 cc. of ethylene per cubic centimeter of solution.

Addition properties of the solutions containing maleic acid are summarized in the following table:

*Table III*

| Exp. No. | MeOH, cc. | Mono-Ethanol Amine, cc. | Maleic Acid, gm. | CuCl, gm. | Absorption Capacity cc. gas per cc. solution |
| --- | --- | --- | --- | --- | --- |
| 1 | 20 | 20 | 1.0 | 35 | 17.3 |
| 2 | 20 | 20 | 2.0 | 35 | 19.0 |
| 3 | 20 | 20 | 2.0 | 40 | 21.0 |
| 4 | 20 | 20 | 3.0 | 35 | 18.0 |
| 5 | 20 | 20 | 4.0 | 40 | 17.7 |
| 6 | 25 | 25 | 3.0 | 40 | 18.3 |
| 7 | 20 | 20 | 0 | 20 | 11.5 |

It is apparent that with maleic acid also the improvement in the absorptive capacity of the solution does not continue indefinitely with continued acidification of the solution, but finds an optimum level corresponding to a slightly acidified solution.

EXAMPLE IV

A solution consisting of 20 cc. of methanol, 20 cc. of mono-ethanolamine, 35 grams of cuprous chloride and 0.3 gram of sulfamic acid was found by the standard test described to have an absorptive capacity of 18.6 cc. of ethylene per cc. of solution. Likewise, a solution containing 20 cc. of methanol, 20 cc. of mono-ethanolamine, 30 grams of cuprous chloride, and 1 gram of sulfamic acid was found to have an absorptive capacity of 20.1 cc. of ethylene per cc. of solution.

Additional properties of variants of the solution are summarized in the following table:

Table IV

| Exp. No. | MeOH, cc. | Mono-ethanol Amine, cc. | Sulfamic Acid, gm. | CuCl, gm. | Absorption Capacity cc. gas per cc. solution |
|---|---|---|---|---|---|
| 1 | 20 | 20 | 1.0 | 30 | 20.1 |
| 2 | 20 | 20 | 3.0 | 28 | 22.0 |
| 3 | 20 | 20 | 3.0 | 35 | 19.8 |
| 4 | 20 | 20 | 5.0 | 40 | 22.0 |
| 5 | 20 | 20 | 5.0 | 28 | 21.7 |
| 6 | 20 | 20 | 10.0 | 28 | 19.3 |
| 7 | 20 | 20 | 15.0 | 28 | 19.8 |
| 8 | 20 | 20 | 0 | 20 | 11.5 |

It is apparent that optimum absorptive capacity of the solution as balanced against the physical properties of the acid and cuprous chloride content thereof is developed when the solution contains about 30 grams of cuprous chloride and about 1 to 3 grams of sulfamic acid.

EXAMPLE V

Similar tests were conducted to determine the absorptive capacity of methanol, mono-ethanolamine solutions containing cuprous chloride and a number of other organic acids, typical among which were salicylic, chloracetic, sulfanilic, sulfosalicylic, citric, tartaric and formic. In all cases it was found that acidification increased the capacity of the solution to take up cuprous chloride and that the capacity of the solution for the absorption of ethylene was likewise increased. Typical results are tabulated in the following table:

Table V

| Exp. No. | MeOH, cc. | Mono-Ethanol Amine, cc. | Acid, gm. | CuCl, gm. | Abs. Capacity cc. gas per cc. solu. |
|---|---|---|---|---|---|
| 1 | 20 | 20 | Salicylic—2 | 40 | 24.3 |
| 2 | 20 | 20 | Sulfosalicylic—4 | 40 | 22.0 |
| 3 | 25 | 25 | Citric—5 | 60 | 21.3 |
| 4 | 25 | 25 | Tartaric—5.5 | 60 | 19.0 |
| 5 | 20 | 20 | Chloroacetic—2 | 40 | 19.7 |
| 6 | 20 | 20 | Sulfanilic—2 | 40 | 23.3 |

From the above examples and data summarized it is apparent that the absorptive capacity of a cuprous chloride solution for ethylene can be materially increased by the incorporation of an acid in the solution. The benefits accruing from the acidification of the solution are at an optimum level when the acidification is kept sufficiently moderate to increase the capacity of the solution to take up cuprous chloride beyond what the unacidified solution will dissolve. Substantial excesses of the acids, particularly of the inorganic acids, not only do not give increasing benefits in the form of increased absorptive capacity, but in most cases actually are detrimental in that they decrease the absorptive capacity of the solution and so alter the physical properties of the solution as to make operation therewith difficult.

In all of the experiments the solutions were prepared in substantially the following manner. The desired amount of methanol and ethanolamine were measured out, mixed with the amount of cuprous chloride it was desired to incorporate therein and acidified. In all cases the amount of cuprous chloride was substantially in excess of that which would saturate the unacidified solvent. The excess cuprous chloride was taken up by the acidification of the suspension. The absorptive capacity of the solution was measured by passing ethylene gas through a cylinder packed with glass beads and containing the solution in simulation of conditions which would be found in a large scale absorption tower. In each case about 40 cc. of solution held at about 20° C. was used to take up the ethylene gas which was bubbled through it at the rate of about 300 cc. per minute.

In full scale operation it is relatively simple to maintain the experimental conditions for ambient temperature and pressure in the absorption tower represent convenient and economically efficient conditions. Operation at elevated pressures is feasible but generally advantages derived are not commensurate with increased complications.

The absorbed olefin is easily recovered by heating the absorbent solution to about 50°–100° C. and collecting the released gas.

Since many changes can be made in carrying out the olefin separation process described without material departure from the spirit or scope of the invention, it is intended that all matter contained in the above description shall be interpreted as illustrative and not in a limiting sense.

What is claimed is:

1. A method of separating olefins from olefin-containing gas mixtures which comprises, contacting the mixture with an olefin absorbent solution comprising a cuprous salt dissolved in an anhydrous acidified solvent consisting of an alkylolamine and a low-boiling mono-hydric alcohol, said salt being present in amount substantially in excess of the amount soluble in the unacidified solvent.

2. A method of separating olefins from olefin-containing hydrocarbon mixtures which comprises, contacting the mixture with a solution having selective absorbent power for olefins comprising cuprous chloride dissolved in an anhydrous acidified solvent consisting of an alkylolamine and a low-boiling mono-hydric alcohol, the amount of cuprous chloride being substantially more than will saturate the unacidified solvent.

3. The process of separating olefins from gas mixtures in accordance with claim 2, wherein the acid is an inorganic mineral acid.

4. The process of separating olefins from gas mixtures in accordance with claim 2, wherein the acid is an inorganic mineral acid present in a ratio of not more than about 1 part by weight of acid to about 10 parts by weight of cuprous chloride.

5. The process of separating olefins from gas mixtures in accordance with claim 2 wherein the acid is an organic acid.

6. The process of separating olefins from gas mixtures in accordance with claim 2 wherein the acid is hydrogen chloride.

7. The process of separating olefins from gas mixtures in accordance with claim 2 wherein the acid is hydrogen chloride present in an amount corresponding to not more than about 1 part by weight to about 10 parts by weight of cuprous chloride.

8. The process of separating olefins from gas mixtures in accordance with claim 2 wherein the acid is phosphoric acid.

9. The process of separating olefins from hydrocarbon gas mixtures which comprises contacting the mixture with a solution having selective absorbent power for olefins, comprising cuprous chloride dissolved in an acidified solvent consisting of an alkanolamine and a low boiling mono-hydric alcohol, the amount of cuprous chloride being substantially more than will saturate the unacidified solvent and wherein the acid is benzoic acid.

10. The process of separating olefins from gas mixtures in accordance with claim 2 wherein the acid is maleic acid.

11. The process of separating olefins from gas mixtures in accordance with claim 2 wherein the acid is chloracetic acid.

12. The method of separating ethylene from a hydrocarbon mixture which comprises, contacting the mixture with a solution having selective absorbent power for olefins, said solution comprising cuprous chloride dissolved in a solvent acidified with benzoic acid, said solvent consisting of an alkanolamine and a low boiling monohydric alcohol, the amount of cuprous chloride being substantially more than will saturate the unacidified solvent.

13. A method of separating olefins from olefin containing gas mixtures which comprises, contacting the mixture with an olefin absorbent solution comprising a cuprous salt dissolved in an anhydrous acidified solvent consisting of an alkylolamine and a low boiling monohydric alcohol, said salt being present in amount substantially in excess of the amount soluble in the unacidified solvent, the acid being selected from the group consisting of hydrochloric acid, phosphoric acid, sulfuric acid, benzoic acid, maleic acid, sulfamic acid, salicylic acid, chloracetic acid, sulfanilic acid, sulfosalicylic acid, citric acid, tartaric acid and formic acid.

MICHAEL SAVOY.

REFERENCES CITED

The following references are of record in the file of this patent:

UNITED STATES PATENTS

| Number | Name | Date |
|---|---|---|
| 1,999,159 | Van Peski | Apr. 23, 1935 |
| 2,005,500 | Joshua et al. | June 18, 1935 |
| 2,058,851 | Brooks | Oct. 27, 1936 |
| 2,376,239 | Evans et al. | May 15, 1945 |
| 2,386,256 | Morris | Oct. 9, 1945 |